United States Patent
Toral Vazquez et al.

(10) Patent No.: US 10,023,299 B2
(45) Date of Patent: Jul. 17, 2018

(54) PROPELLER BLADE FOR AN AIRCRAFT ENGINE

(71) Applicant: AIRBUS OPERATIONS, S.L., Getafe (Madrid) (ES)

(72) Inventors: Javier Toral Vazquez, Getafe Madrid (ES); Diego Folch Cortes, Getafe Madrid (ES); Esteban Martino Gonzalez, Getafe Madrid (ES); Pablo Goya Abaurrea, Getafe Madrid (ES); Vasilis Votsios, Getafe Madrid (ES); Michel Fouinnetau, Toulouse (FR); Sylvain Roumegas, Toulouse (FR)

(73) Assignee: AIRBUS OPERATIONS, S.L., Getafe (Madrid) (ES)

( * ) Notice: Subject to any disclaimer, the term of this patent is extended or adjusted under 35 U.S.C. 154(b) by 259 days.

(21) Appl. No.: 14/757,591

(22) Filed: Dec. 23, 2015

(65) Prior Publication Data

US 2016/0176509 A1 Jun. 23, 2016

(30) Foreign Application Priority Data

Dec. 23, 2014 (EP) .................................. 14382565

(51) Int. Cl.
*B64C 11/20* (2006.01)
*B64C 11/26* (2006.01)

(52) U.S. Cl.
CPC .......... *B64C 11/26* (2013.01); *B64D 2201/00* (2013.01)

(58) Field of Classification Search
CPC ....... B64C 11/20; B64C 11/205; B64C 27/00; B64D 45/00
See application file for complete search history.

(56) References Cited

U.S. PATENT DOCUMENTS

| | | | |
|---|---|---|---|
| 1,360,596 A | 11/1920 | John | |
| 2,489,799 A | 11/1949 | Minshall | |
| 2,616,509 A * | 11/1952 | Wilfred | B64C 3/30 244/113 |
| 2,657,754 A | 11/1953 | Conwell | |
| 3,101,121 A * | 8/1963 | MacNeal | B64C 27/46 244/123.11 |
| 3,384,183 A * | 5/1968 | Braverman | B64C 3/30 416/84 |
| 3,957,232 A * | 5/1976 | Sebrell | B64C 3/30 244/123.11 |
| 2003/0156944 A1 | 8/2003 | Rust | |

(Continued)

OTHER PUBLICATIONS

Extended European Search Report; dated May 29, 2015, 4 Pages.

*Primary Examiner* — Patrick Maines
(74) *Attorney, Agent, or Firm* — John S. Artz; Dickinson Wright PLLC

(57) ABSTRACT

The disclosure refers to a propeller blade for an aircraft engine that includes an airbag system contained inside the blade and comprising at least one bag and at least one gas generator, the at least one gas generator in fluid communication with at least one bag for inflating the bag, a detecting system for detecting a rupture of a part of the blade, a trigger for activating the at least one gas generator when the rupture is detected by the detecting system, and the blade skin being configured for allowing the at least one bag to pass through the blade skin for being expanded outside the blade upon the bag inflation by the gas generator.

14 Claims, 5 Drawing Sheets

(56) References Cited

U.S. PATENT DOCUMENTS

| | | | |
|---|---|---|---|
| 2007/0110584 A1* | 5/2007 | Stommel | F03D 1/0675 |
| | | | 416/233 |
| 2009/0238692 A1* | 9/2009 | Buchler | F01D 5/28 |
| | | | 416/240 |
| 2010/0143130 A1* | 6/2010 | Cairo | F03D 1/065 |
| | | | 416/84 |
| 2012/0292456 A1 | 11/2012 | Hollimon et al. | |
| 2013/0099057 A1 | 4/2013 | Gonzalez et al. | |
| 2013/0105625 A1 | 5/2013 | Mailliu et al. | |

* cited by examiner

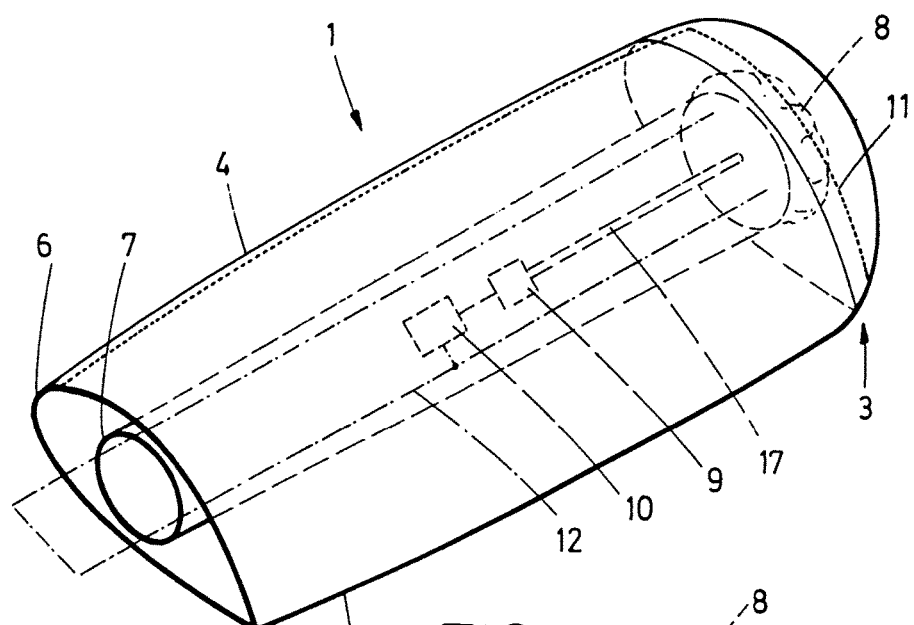
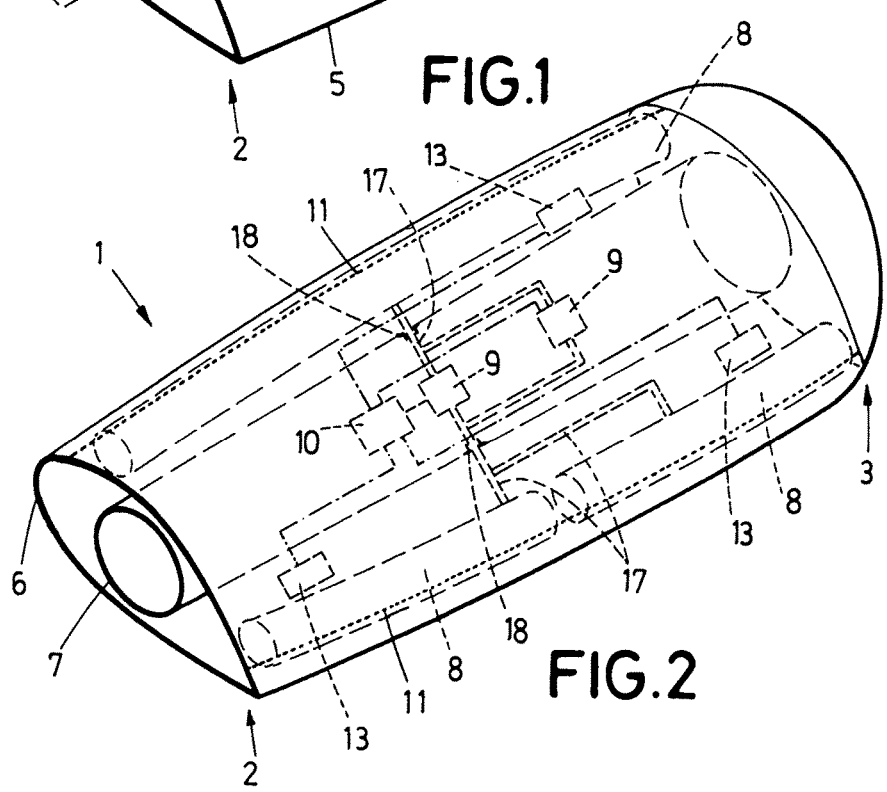

PROPELLER BLADE FOR AN AIRCRAFT ENGINE

CROSS-REFERENCE TO RELATED APPLICATIONS

The present disclosure claims priority to European Application No. 14382565.1 filed on Dec. 23, 2014, which is hereby incorporated by reference, as though set forth fully herein.

FIELD OF DISCLOSURE

The present disclosure refers to a propeller blade for an aircraft engine, and also to a propeller for an aircraft.

An object of the disclosure is to provide a propeller blade for an aircraft engine that minimizes the hazard caused to the aircraft, when it breaks or is entirely released from its hub.

Another object of the present disclosure is to provide a propeller blade for an aircraft engine, which complies with the standards and safety requirements demanded by airworthiness authorities concerning blade impact.

BACKGROUND OF THE DISCLOSURE

Historically, propeller blades have been made with different materials and architectures. Both concepts have evolved from wooden blades to composite materials with an increasing complexity in their configurations.

As is known, blades are mounted on propellers, which are located close to the aircraft structure, vital systems for the aircraft proper operation, and also close to the opposite propeller. In addition to their compromised location, blades in propeller engines are not covered by a fairing or nacelle. Both conditions, being in a potentially risky location for an aircraft normal operation and being unprotected, mean that blade impacts have been recently considered by airworthiness authorities.

Blades may break, in part or completely, or be entirely released from the propeller hub. In almost all these cases, this leads to serious damages in the aircraft structure and/or its systems because of the impact, and to a consequent unbalanced situation of the engine caused by the broken or released blade.

Therefore, airworthiness authorities have requested aircraft manufacturers and engine suppliers to consider the impact scenario due to a blade release, in order to be able to withstand the impact, especially when the aircraft is in flight. Thus, the risk of catastrophic effects derived from the release has to be minimized.

It would therefore be desirable to provide a propeller that complies with airworthiness requirements to ensure a continued safe flight and landing of an aircraft in which a blade has been partially or entirely released.

SUMMARY OF THE DISCLOSURE

The present disclosure overcomes the above mentioned drawbacks by providing a propeller blade for an aircraft engine, which minimizes the damage caused to the aircraft in case of blade impact.

An aspect of the disclosure refers to a propeller blade for an aircraft engine, the blade comprising a root at one end and a tip at its other end, a leading edge and a trailing edge at opposite sides and extended between the root and the tip, wherein the blade is covered by a skin and has an annular spar in its interior. According to the disclosure, the blade additionally includes an airbag system, a detecting system, a trigger, and a blade skin configuration for allowing the at least one bag to pass through the blade skin. The airbag system is contained inside the blade and includes at least one bag and at least one gas generator, wherein the at least one gas generator is in fluid communication with at least one bag for inflating the bag. The detecting system is suitable for detecting a rupture of a part of the blade. The trigger is suitable for activating the at least one gas generator when the rupture is detected by the detecting system. The blade skin is configured for allowing the at least one bag to pass through the blade skin for being expanded outside the blade upon its inflation by the gas generator.

The disclosure provides an airbag system integrated inside the blade for minimizing the damage caused to the aircraft when the blade is partially or entirely released. In addition to the airbag system, the blade of the disclosure is configured for that the bag reaches a fully opened condition outside the blade, and is provided for enabling an effective detection, either in the event of a partial or entire blade release.

In one aspect, at least one frangible line in the blade skin is provided for allowing the bag to pass through it, the blade of the disclosure enables the passage of the bag through the blade skin. Thus, the frangible line ensures a fully opened condition of the bag. In addition, the frangible line provides the most promising line of rupture, and thereby a controlled path for the bag output and location. This way, the disclosure enables protecting selected areas of the blade, which will correspond with the more critical areas of the blade considering an impact scenario. The critical areas are the most probable areas involved in an impact against the aircraft fuselage. Main critical areas correspond to the tip, the leading edge, and the trailing edge of the blade. Thereby, the main sharp elements of the blade can be covered by one or several bags.

In addition, the inflated bag acts as an energy absorber, reducing the amount of energy that would be transmitted to the aircraft structure. Thus, the bag performs as a damper in the impact, contributing to the hazard minimization on the impact scenario.

Besides, upon its inflation, the bag acts as an aerodynamic brake achieving a speed reduction. The bag inflation increases the drag withstand by the blade, reducing the impact velocity, and therefore the impact energy.

Additionally, the blade of the disclosure comprises a detecting system for activating the inflation of the bag when a fracture is detected. For that, the blade comprises a detecting system for detecting a fracture, either of a part or the entire blade, and a trigger for activating the gas generator when the rupture is detected. This way, the detection is performed by the proper blade, triggering the expansion of the bag if necessary. Thus, the disclosure achieves a dedicated and a cost-effective solution for a propeller of an aircraft, since only the damaged blade has to be replaced.

The disclosure offers an integrated and compact solution by disposing the solution in the blade. Thus, the disclosure avoids performing any modification in any of the blade surrounding structures when it is mounted on a propeller of an aircraft. So, the disclosure perfectly couples with conventional aircraft design. This easies the installation of the blade, and limits the cost involved by the disclosure.

Further, the disclosure provides a quick response in case of blade release. Thus, the disclosure achieves protecting the aircraft before the blade impacts the aircraft, thereby minimizing the damage caused by the blade release.

BRIEF DESCRIPTION OF THE DRAWINGS

For a better comprehension of the disclosure, the following drawings are provided for illustrative and non-limiting purposes, wherein:

FIG. 1 shows a schematic view of a blade according to an aspect of the present disclosure.

FIG. 2 shows a schematic view of a blade according to another aspect of the present disclosure.

DETAILED DESCRIPTION OF THE PRESENT DISCLOSURE

Figure 3:
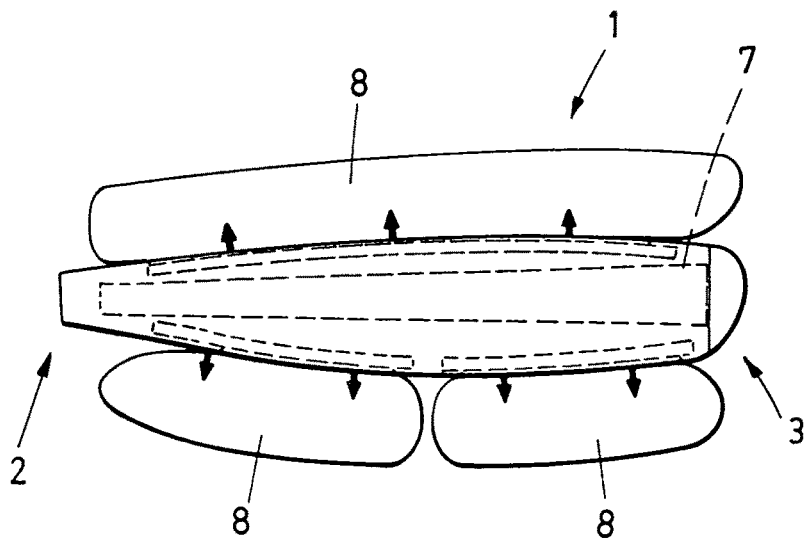
FIG. 3 shows a schematic view of the aspect of FIG. 2 with the bags fully expanded.

FIG. 1 shows a schematic perspective view of a blade 1 according to the disclosure. Conventionally, the blade 1 includes two ends, a root 2 and a tip 3, and two opposite edges, a leading edge 4 and a trailing edge 5 extended therebetween. Also, the blade 1 is covered by a skin 6 and includes an annular spar 7 inside thereof, the spar 7 being the structural component of the blade 1, and filled with foam inside thereof. In addition, the blade 1 of the disclosure has an airbag system, at least one frangible line 11 on the skin 6 to allow its expansion outside the blade, a detecting system, and a trigger 10.

As shown, the airbag system is integrated inside the blade 1 and includes at least one bag 8 and at least one gas generator 9 for the bag's 8 inflation. The detecting system is in communication with the trigger 10 for generating a response to the detection, wherein the trigger 10 is in turn, in communication with at least one gas generator 9 for performing the inflation of the bag 8.

The airbag system of the aspect shown in FIG. 1 comprises one gas generator 9 and one bag 8. The gas generator 9 is in fluid communication with the bag 8 for enabling the bag's 8 inflation. This fluid communication can be provided by tubes 17.

According to an aspect, the gas generator 9 is placed inside the spar 7. Thus, the disclosure takes advantages of the spar 7 configuration, since the locating of the gas generator 9 inside the spar 7 avoids the need of providing room for its position.

As shown in FIG. 1 and according to another aspect, the bag 8 is contained inside the tip 3 of the blade 1. Thus, the tip 3 will be covered and protected by the bag 8 in the event of a blade release.

For allowing the inflation and the fully extension of the bag 8 outside the blade 1, the tip 3 may be provided with a frangible line 11 at its blade skin 6 for allowing its rupture. Alternatively, the tip 3 can be detachably mounted in the blade 1, providing a frangible line 11 around its mounting/dismounting surface to the rest of the blade 1. In this case, a way out for a bag 8 is also provided, since the bag 8 would pass through the opening that left the tip 3 upon the detachment.

Additionally, FIG. 1 shows a detecting system according to another aspect. The detecting system comprises an electric closed circuit 12 extending along a part of the blade span, preferably, along its whole span. In this aspect, the trigger 10 is electrically connected to the closed circuit 12 for activating the gas generator 9 when the circuit 12 is opened. This system allows detecting a full blade release, and a partial blade release provided the extension of the circuit 12 reaches the release area.

According to another aspect, the gas generator 9 is placed at a distance from the root 2 of the blade 1 of at least three quarters of the blade span. Thus, the gas generator 9 is placed closer to the tip 3 than the root 2, since in most cases the detached part of the blade 1 is the tip 3. At the same time, this location takes advantage of using the broadest section of the blade to locate the gas generator 9.

FIG. 2 shows a schematic perspective view of a blade 1 that comprises an airbag system with three bags 8 and two gas generators 9. According to another aspect, one of the bags 8 is placed outside the spar 7, along the leading edge 4 of the blade 1, wherein the leading edge 4 comprises one frangible line 11.

As shown in FIG. 3, locating the bag 8 at the leading edge 4 allows covering this edge in case that the detecting system detects a rupture of at least one part of the blade 1. Thus, the potential damaged caused by the impact of the leading edge 4 on an aircraft is highly reduced.

Also, and according to another aspect, two of the bags 8 depicted in FIG. 2 are placed outside the spar 7, along the trailing edge 5 of the blade 1, wherein the trailing edge 5 comprises one frangible line 11.

Likewise, as shown in FIG. 3, locating the bag 8 at the trailing edge 5 allows covering this edge in case of that the detecting system detects a blade rupture. This way, the potential damaged caused by the impact of the trailing edge 5 on an aircraft is highly reduced.

In both cases, frangible lines 11 are respectively performed at the leading 4 and trailing edge 5 for allowing corresponding bags 8 to pass through the blade skin 6, for being fully expanded outside the blade 1 upon their inflation by the gas generators 9.

As shown in FIG. 2, the blade 1 can be provided with two gas generators 9. Multiple gas generators 9 may be used to inflate different bags in case that multiple bags 8 are also provided, or for redundancy purposes to ensure the inflation of the bag 8 in the event of a gas generator 9 malfunctioning.

In one aspect, placing the gas generator 9 inside the spar 7 and the bag 8 outside the spar 7, either at the leading edge 4 or at the trailing edge 5, requires providing an opening 18 in the spar 7 structure for enabling the inflation of the bag 8. In this scenery, and according to another aspect, the blade 1 includes a tube 17 passing through the spar 7 for allowing the fluid communication between the at least one gas generator 9 and the at least one bag 8. With respect to the aspect depicted in FIG. 1, it is noted that the opening 18 is avoided placing the bag 8 at the tip 3 of the blade 1, since as FIG. 1 shows, the tube 17 runs along the spar 7 until reaching the bag 8.

Additionally, FIG. 2 shows a detecting system according to another aspect. The detecting system comprises at least one accelerometer 13 positioned in a part of the blade 1 for detecting data of acceleration of the part of the blade 1. Besides, the trigger 10 is in communication with the at least one accelerometer 13 for activating the gas generator 9 when the acceleration data exceeds a threshold. This way, the trigger 10 is able to monitor the acceleration data sensed by the accelerometers 13 and activate the gas generator 9 according to a predetermined threshold. The full or partial blade release detection will be subjected to accelerometers 13 positioning and to the threshold set. Preferably, accelerometers 13 will be positioned scattered along the blade skin 6. Also, the threshold allows providing different degrees of tolerance in the detection.

According to another aspect, the gas generator 9 is placed at a distance from the root 2 of the blade 1 of at least three quarters of the blade span. Thus, the gas generator 9 is placed closer to the tip 3 than the root 2, since in most cases the detached part of the blade 1 is the tip 3. At the same time, this location takes advantage of using the broadest section of the blade to locate the gas generator 9.

Figure 4:
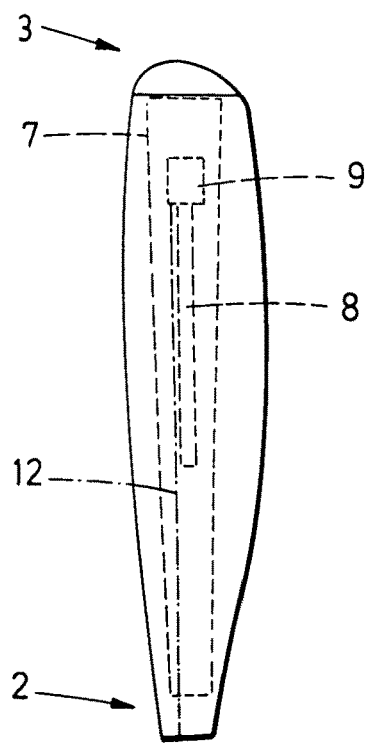
FIG. 4 shows a schematic view of a blade according to another aspect of the present disclosure.

FIG. 4 shows another aspect in which the gas generator 9 is placed closer to the tip 3 than the root 2, preferably, at a distance of at least three quarters from the root 2 of the blade 1. Placing the gas generator 9 near the tip 3, allows the disclosure protecting the majority of blade release cases. Also, in this aspect, the bag 8 is placed so as to expand around the outside surface of the detached part of the blade 1, and the bag 8 has a length that allows covering completely the outside surface of the detached part of the blade 1 when the bag 8 is fully expanded.

Figures 5A, 5B:
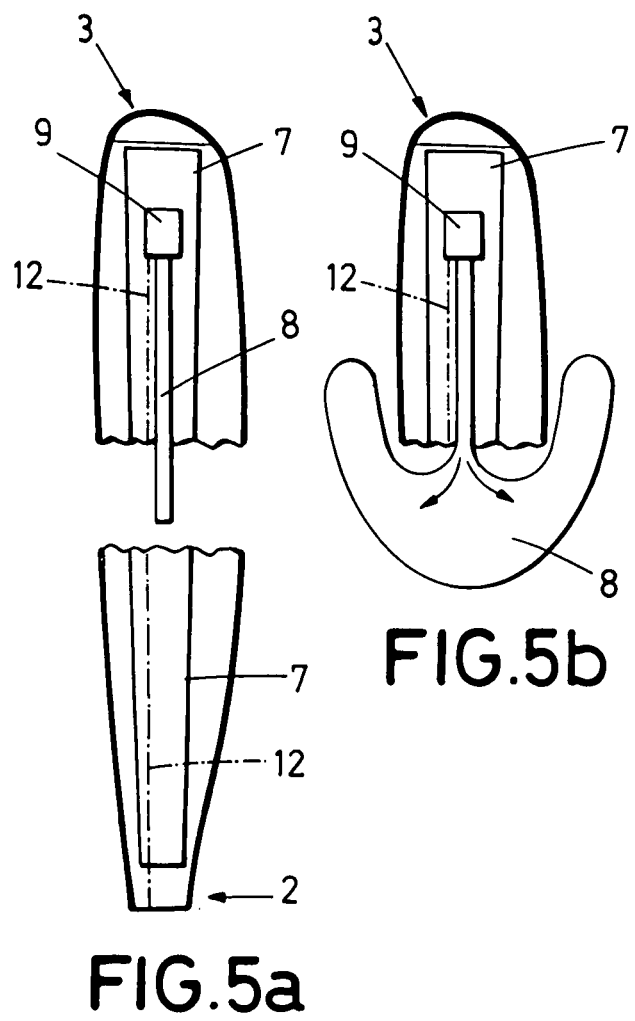
FIG. 5a-5e shows different stages of the expansion of a bag contained in the blade shown in FIG. 4.
Figure 5C:
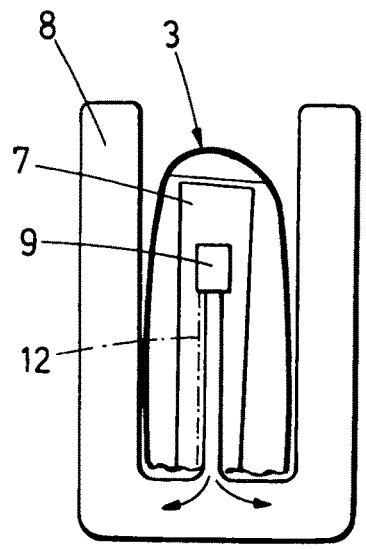
Figure 5D:
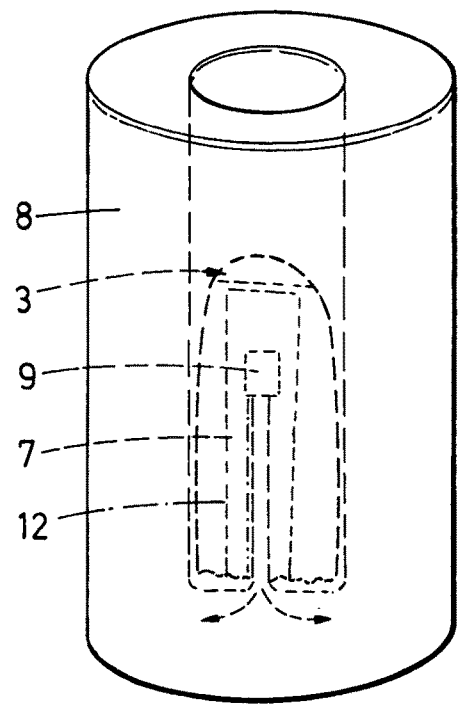
Figure 5E:
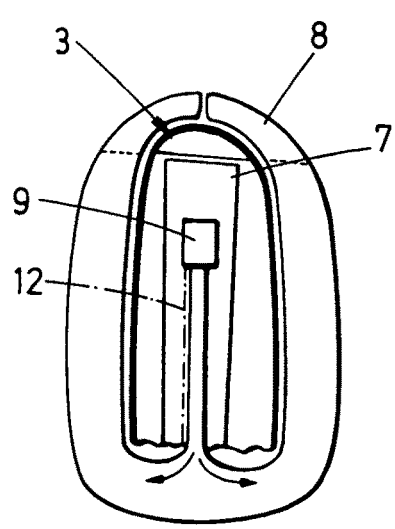

FIGS. 5a and 5b show the deployment of the bag 8 according to the aspect shown in FIG. 4, whereas FIGS. 5c (or 5d) and 5e show two different types of deployed bags. FIGS. 5c and 5d show, respectively, a section view and a perspective view of one bag configuration, and FIG. 5e shows a section view of another bag configuration. Preferably, the bag 8 is long enough to fully cover the outside surface of the blade 1.

As shown in FIGS. 5c and 5d, the bag 8 is cylinder shaped when expanded, and an inner diameter of the cylinder is larger than the widest section of the blade 1. In one aspect, the bag 8 is long enough to fully cover the outside surface of the blade 1, preferentially, the bag 8 projecting beyond the tip 3 of the blade 1. This way, the bag 8 achieves to protect the tip 3 of the blade 1 in a simple and effective manner.

As shown in FIG. 5e and according to another aspect, the bag 8 includes a first part, cylinder shaped to contain the detached part of the blade 1, and a second part having a shape that is able to take the form of the outside surface of the blade 1, such a petals, covering the tip 3 of the blade 1.

According to another aspect, the frangible line 11 has a reduction in the blade skin 6 thickness. Alternatively, the frangible line 11 has a plurality of drillings performed in the blade skin 6.

According to another aspect, the blade skin 6 is made of composite material.

Figure 6:
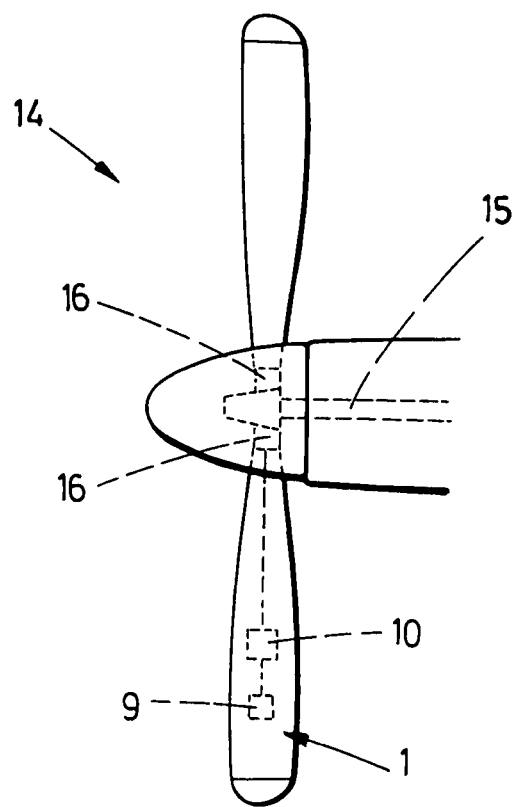
FIG. 6 shows a schematic view of a propeller of an aircraft comprising at least two blades according to the disclosure.

FIG. 6 shows a propeller 14 according to another aspect of the disclosure. The propeller 14 includes at least two propeller blades 1 as described above.

Considering the propeller, and specifically the at least one shaft 15 for driving the blades, another detecting system can be provided for the blades 1 of the disclosure. Thus, according to another aspect, the detecting system of each blade 1 includes at least one load cell 16 placed onto the shaft 15 for detecting blade weight, and wherein the trigger 10 of each blade 1 is in communication with the at least one load cell 16 for activating the gas generator 9 of the blade 1 when the weight data of the corresponding blade 1 exceeds a threshold. In this aspect, the trigger 10 is configured to motorize the weigh data sensed by the load cell 16 corresponding to the blade 1, and to activate the gas generator 9 when the sensed data excesses the threshold. This aspect is more appropriate for full blade release detection, however, a partial blade release can be detected providing sensitive detection with low-tolerance thresholds, or accurate load cells able to measure low variations of weight.

What is claimed:

1. A propeller blade for an aircraft engine, the propeller blade comprising:
   a root at one end and a tip at the other end, a leading edge and a trailing edge at opposite sides and extending between the root and the tip, said blade covered by a skin and having an annular spar in its interior;
   an airbag system contained inside the propeller blade and having at least one bag and at least one gas generator in fluid communication with the at least one bag for inflating the bag;
   a detecting system for detecting a rupture of a part of the blade; and
   a trigger for activating the at least one gas generator when the rupture is detected by the detecting system,
   wherein the blade skin is configured to allow the at least one bag to pass through the blade skin and to allow the bag to expand outside the blade upon the bag's inflation by the gas generator.

2. The propeller blade according to claim 1, further comprising:
   at least one frangible line in the blade skin for allowing the bag to pass through the blade skin.

3. The propeller blade according to claim 2, wherein the frangible line has one of a reduction in the blade skin thickness and a plurality of drillings performed in the blade skin.

4. The propeller blade according to claim 1, wherein the gas generator is disposed inside the spar.

5. The propeller blade according to claim 4, further comprising:
   a tube passing through the spar for allowing the fluid communication between the at least one gas generator and the at least one bag.

6. The propeller blade according to claim 1, wherein the bag is contained inside the tip of the blade.

7. The propeller blade according to claim 1, wherein the tip has a frangible line.

8. The propeller blade according to claim 1, wherein the tip is detachably mounted in the blade.

9. The propeller blade according to claim 1, wherein the bag is disposed outside the spar along the leading edge of the blade, said leading edge has at least one frangible line.

10. The propeller blade according to claim 1, wherein the bag is placed outside the spar along the trailing edge of the blade, said trailing edge has at least one frangible line.

11. The propeller blade according to claim 1, wherein the bag is cylinder shaped when expanded, and wherein an inner diameter of the cylinder shape is larger than a widest section of the blade.

12. The propeller blade according to claim 1, wherein the gas generator is disposed at a distance from the root of the blade of at least three quarters of the blade span.

13. The propeller blade according to claim 1, wherein the detecting system has an electric closed circuit extended along a part of the blade span, and wherein the trigger is electrically connected to said closed circuit for activating the gas generator when the circuit is opened.

14. The propeller blade according to claim 1, wherein the detecting system has at least one accelerometer positioned in a part of the blade for detecting data of acceleration of said part of the blade, and wherein the trigger is in communication with the at least one accelerometer for activating the gas generator when the acceleration data exceeds a threshold.

* * * * *